United States Patent [19]

Gaiser et al.

[11] 4,127,925
[45] Dec. 5, 1978

[54] METHOD OF MANUFACTURING AND LOADING MAGNETIC TAPE CASSETTES, PARTICULARLY COMPACT CASSETTES

[75] Inventors: Dieter Gaiser, Diersheim; Josef Woellhaf, Ludwigshafen; Klaus Schoettle, Heidelberg; Friedrich Guenther; Eugen Kamm, both of Willstaett; Erich Wendt, Lampertheim, all of Fed. Rep. of Germany

[73] Assignee: BASF Aktiengesellschaft, Ludwigshafen, Fed. Rep. of Germany

[21] Appl. No.: 741,357

[22] Filed: Nov. 12, 1976

Related U.S. Application Data

[63] Continuation-in-part of Ser. No. 635,177, Nov. 25, 1975, abandoned.

[30] Foreign Application Priority Data

Nov. 26, 1974 [DE] Fed. Rep. of Germany ....... 2455755

[51] Int. Cl.² ..................... B23P 19/04; B23P 21/00
[52] U.S. Cl. ...................................... 29/430; 29/806; 29/281.1; 53/430; 29/773

[58] Field of Search ................. 29/430, 429, 428, 434, 29/464, 806, 819, 281.1, 281.4, 281.5, 773; 53/21 FW, 145, 146, 392

[56] References Cited

U.S. PATENT DOCUMENTS

| | | | |
|---|---|---|---|
| 387,140 | 7/1888 | Buck | 53/145 |
| 1,631,005 | 5/1927 | Breckon | 53/146 |
| 2,573,432 | 10/1951 | Girard et al. | 29/281.4 |
| 2,995,809 | 8/1961 | Riedel | 29/281.4 |
| 3,226,816 | 1/1966 | Wilson et al. | 29/430 |
| 3,457,627 | 7/1969 | Napor et al. | 29/430 |
| 3,499,202 | 3/1970 | Napor et al. | 29/430 |
| 3,684,203 | 8/1972 | Tollkuhn | 242/198 |
| 3,930,296 | 1/1976 | Hoover | 29/430 |
| 4,035,899 | 7/1977 | Matsuda | 29/806 |

*Primary Examiner*—Charlie T. Moon
*Assistant Examiner*—Daniel C. Crane
*Attorney, Agent, or Firm*—Keil, Thompson & Shurtleff

[57] ABSTRACT

A mechanical method of manufacturing magnetic tape cassettes, wherein the magnetic tape is loaded into the cassette during assembly of the cassette parts, and a support controllable by a mechanical conveyor system and having an intermittently rotatable winding disc for the magnetic tape.

5 Claims, 11 Drawing Figures

METHOD OF MANUFACTURING AND LOADING MAGNETIC TAPE CASSETTES, PARTICULARLY COMPACT CASSETTES

The present application is a continuation-in-part of U.S. patent application Ser. No. 635,177 filed Nov. 25, 1975, now abandoned.

The present invention relates to a method of manufacturing magnetic tape cassettes, particularly compact cassettes, from prefabricated parts on a conveyor system (production line) operating with mainly mechanical elements, wherein loading of the tapes with a magnetic tape of predetermined length and quality together with the leader tapes is included in the assembly process. The invention also relates to a support for carrying out said method.

Units for assembling compact cassettes and loading them with predetermined lengths of tape and operating substantially automatically with mechanical means are known. In such units, a so-called CO cassette is produced in a first stage of production, this cassette not containing any magnetic tape. It contains all of the other cassette parts, including the reels and also the leaders clipped thereto. In a second stage or in a different place, the CO cassette is loaded with unrecorded or prerecorded magnetic tape, to which end the leader is pulled out of the cassette and the tape is spliced thereto. The predetermined length of magnetic tape is wound into the cassette, after which the end of the tape is spliced to the other leader. No fully automatic loading apparatus has hitherto been known for loading such CO cassettes with magnetic tape, and it has been necessary to carry out this work by hand. Even where loading of the cassettes has been partially mechanized, it has hitherto been necessary for an operative to be present at the loaders.

It is thus an object of the invention to provide a manufacturing and loading process for magnetic tape cassettes, which operates with substantially only mechanical means and which makes it possible to produce finished cassettes in an uninterrupted series of operations within a production line without the need for manual operations, starting from the entire set of prefabricated components. A special object associated herewith is to provide a way of winding the magnetic tape such that a pack of magnetic tape of optimum shape may be prepared without the need for guide elements in the cassette and at maximum speed, i.e. in the most economical manner, without damaging the edges of the tape, and of then inserting said pack into the cassette directly during a suitable phase of the manufacturing process and before the two halves of the cassette housing are brought together.

For the required manufacturing process to be economical, it was necessary for the mechanical manufacturing and loading line to have an output of loaded cassettes of one finished cassette approximately every 1.5 seconds. Since it has never been possible to wind the magnetic tape into the cassette by conventional means within said 1.5 seconds, not even when use is made of the highest tape speeds, it was necessary to find a solution to the general problem, by means of which the operation of a plurality of mechanical winding machines synchronizes with the other steps of the cassette-making process. In practice, this requirement means that packs of tape produced by a number of winding machines in a branch line to the main mechanical production line must be mechanically transported to the main production line in step with the operations carried out therein.

This multiple problem involved in the manufacture and loading of magnetic tape cassettes is solved, according to the invention, in that both the exact positioning of the stationary and moving functional elements of the cassette including the reels, and the operation of securing and winding the cut magnetic tape provided with leaders are carried out on a support carrying a winding disc and equipped with accurately dimensioned and shaped compartments or recesses, whereupon all of the positioned elements of the cassette, including the magnetic tape, are inserted into the lower half of the cassette housing in that the latter is placed on top of said support and the support, together with the said cassette elements, tape and lower half of the cassette housing, is turned over, whereupon the upper half of the cassette housing is placed on said assembly and the cassette is finally closed in known manner.

Accordingly, the support used in carrying out the process is both a static mounting aid which is intermittently actuated by means in the production line and which temporarily holds the prefabricated cassette parts as in a template to avoid time-consuming adjustments, and is also, for short periods, a dynamic winding device which is temporarily coupled to a motor drive included in the main production line. Accordingly, the support of the invention is characterized by a block-shaped body having parallel guide surfaces and including one rotatable and one fixed winding disc and a shaped element provided with a number of compartments for the accommodation of the stationary and movable functional elements of the cassette. According to a further feature of the invention, the rotatable winding disc is provided with a disengageable brake. Further features of the invention are discernible from the following detailed description and the accompanying drawings.

The mechanical manufacture of magnetic tape cassettes on automatic machines involving positioning of the internal functional elements of the cassette directly in one of the prefabricated halves of the cassette, by means of controlled gripping means, can only be carried out within the desired cycle time of about 1.5 seconds when the reels and magnetic tape are omitted.

Attempts have been made to produce the packs of magnetic tape in a separate machine, which operation included securing the two ends of the leaders to the two reels. In such a process, the pack of magnetic tape and the two reels would have to be held in a position, accurate to a tenth of a millimeter, and transferred in said position by appropriate transfer means to the lower half of the cassette housing already provided with the internal functional elements. This highly complicated placing operation cannot be carried out mechanically with the degree of accuracy required for operational reliability of the production line.

To increase operational reliability and to permit mechanical insertion of the pack of magnetic tape into the cassette, the cassette production process of the invention provides a number of identical, robust supports which may be referred to as "production templates". With the aid of these dimensionally stable supports, which can be produced with the required degree of accuracy, positioning of the internal functional elements of the cassette, including the reels, attachment of the leaders and winding of the magnetic tape to form the finished pack are carried out in a reliable manner as the elements pass through the individual stations of the production line.

The number of supports required in a production unit of the invention depends on the cycle time, the number of production line stations and the number of winding machines required parallel to this production line, for production of the pack of tape on the support. Winding must be effected in a time which is a multiple of the cycle time for positioning the functional elements fabricated elsewhere, for example guide rolls, pins, pressure springs and liners.

I. Return of support to starting station of production line,
II. Insertion of guide rolls,
III. Insertion of guide levers,
IV. Insertion of screening shield,
V. Insertion of pressure spring,
VI. Insertion of reels,
VII. Clipping of tape to first reel,
VIII. Winding of tape,
IX. Clipping of tape to second reel,
X. Placing of inverted lower half of cassette housing on support,
XI. Turning of support through an angle of 180°,
XII. Raising of support,
XIII. Placing of upper half of cassette housing on lower half,
XIV. Fastening together of the two halves of the cassette housing.

To carry out the process, the required number of supports are provided in a production line, for example a conveyor belt system or other conveyor system, provided with a number of stationary mechanical devices, particularly grippers, for effecting the individual operations. To effect rhythmic motion and to ensure exact timing of the support movements at specific points in the production line, the support requires heavy-duty guide surfaces of adequate size to allow movement according to the perpendicular space coordinates. It is then possible to move the support in longitudinal and transverse directions within its true-to-gauge tolerances, i.e. to move it from a specific station to a portion of the production line which deviates from said line by, say, 90° or to effect a controlled turning movement through, say, 180° about one of its main axes immediately followed by return to a specific true-to-gauge position.

Figure 1:
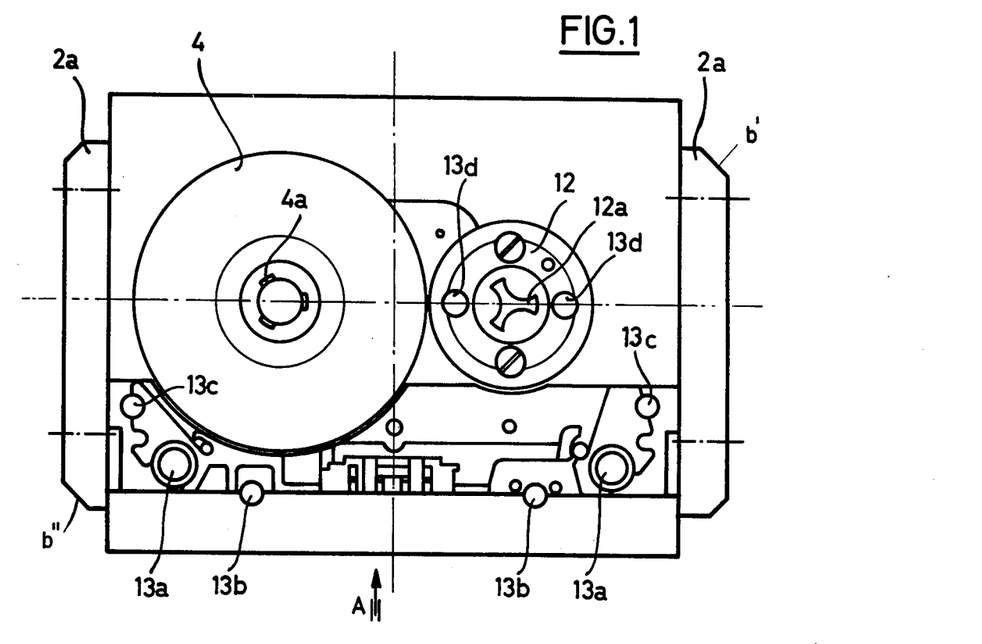
FIG. 1 shows a plan view of the support for carrying out the process.
Figure 1A:
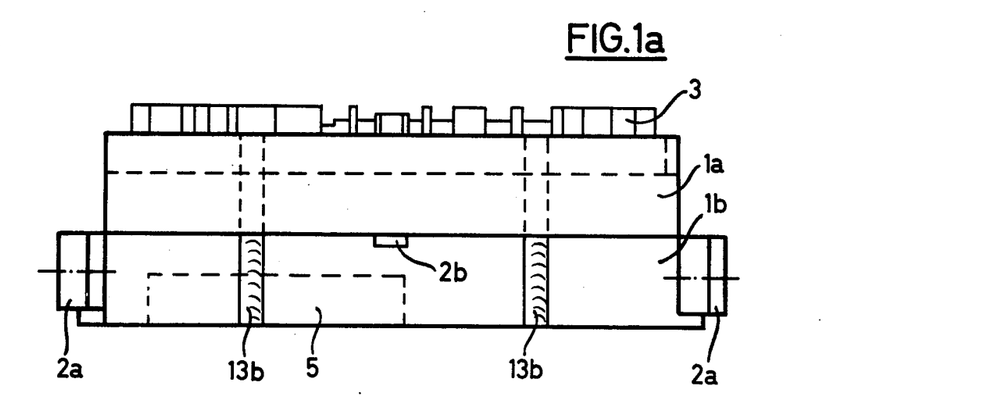
FIG. 1a is a view of the narrow side of the support as seen in the direction of arrow A in FIG. 1.

In a preferred embodiment, the body 1 of the support, which is conveniently made of one and the same material, consists essentially of two blocks 1a and 1b of different lengths and widths (see FIG. 1 and FIG. 1a). The body 1 is preferably made of a relatively hard plastics material such as polyamide. Block 1b has two short diametrically opposed bevelled edges b' and b". Exact positioning of the support for insertion of the internal elements of the cassette and for winding the magnetic tape is ensured by hardened registering strips 2a at its narrow ends and smaller registering stops 2b in the form of, say, hardened bolts in the two longitudinal sides. These stop members 2a and 2b are effective only when the support is moved into position at the individual stations and they are therefore subject to virtually no wear and also cause no wear due to friction between them and guide surfaces in the production line. The internal functional elements of the cassette are accommodated by the receiver 3, which is preferably a zinc die cast part and is releasably mounted on the block 1a of the body, preferably by means of screws. The receiver 3 is a shaped member provided with a number of depressions, ridges and round and multi-sided compartments, and the internal functional elements of the cassette, for example the pressure spring, guide rolls, tape guide levers, and screening shield are inserted into said receiver 3 by means of mechanical grippers provided at fixed points in the production line, said elements remaining therein until they are transferred to the lower half of a cassette housing together with the pack of magnetic tape which, provided with a leader at each end, is clipped to the reels. It will be appreciated that the dimensions of the compartments in the receiver 3 for said functional elements and also for guiding the tape wound onto the reels must show a higher degree of accuracy than the corresponding or congruent compartments in the halves of the cassette housing, as otherwise the mechanical transfer movement would be hampered.

Figure 2:
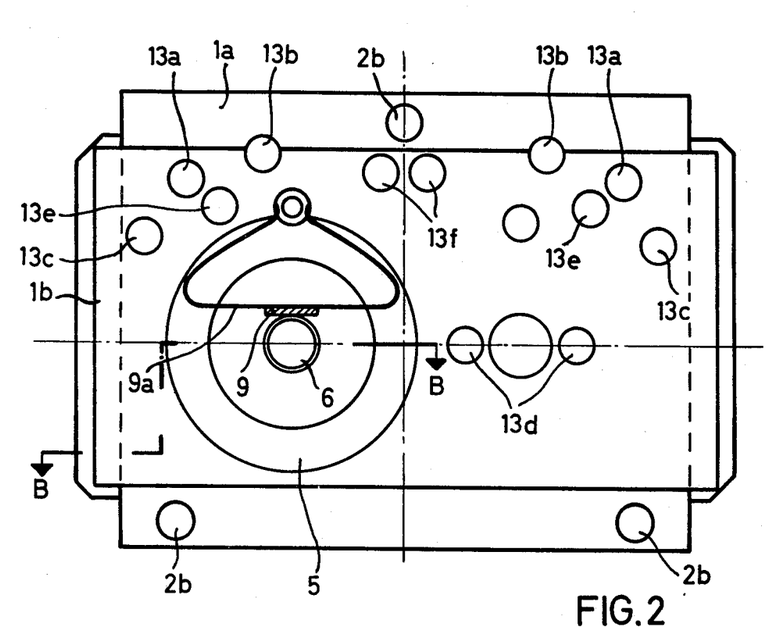
FIG. 2 is view of the underside of the support.
Figure 2A:
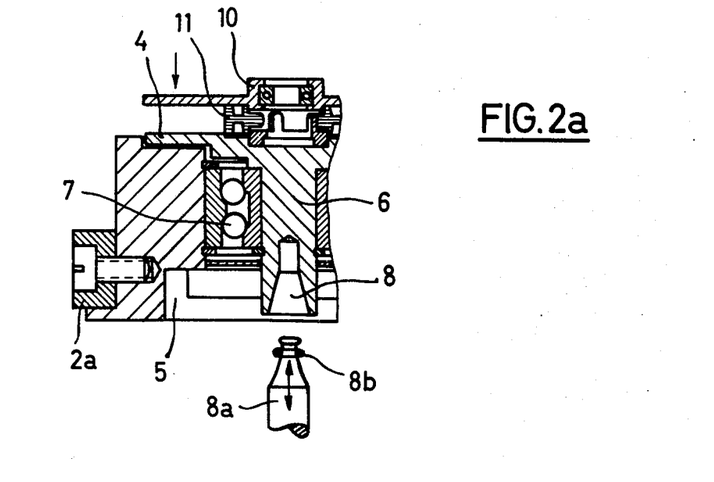
FIG. 2a is a cross section of part of the rotatable winding disc of the support.

The rotatable winding disc 4 is mounted in the support consisting of the blocks 1a and 1b, parallel to the main surfaces thereof. Its winding surface is slightly above the plane of the block 1a and its driving shaft 6 extending downwardly to a recess 5 is guided in a roller bearing 7 which satisfies the requirements for a high-speed mounting (see FIG. 2a). At its driven end, the shaft 6 has a tapered bore 8 into which a correspondingly tapered driving mandrel 8a enters for a period at a specific winding point in the production line, which driving mandrel 8a drives the winding disc 4 via a rubber clutch ring 8b. At all other times apart from the winding operation, the winding disc 4 is arrested by a brake 9 attached to a spring 9a. This brake 9 is lifted from the shaft 6 only during winding to enable rotation to take place at high speed. The brake 9 with its associated spring is in the recess 5 in the block 1b of the body (see FIGS. 2 and 2a). In the latter FIG. 2a there is shown an auxiliary disc 10 above the winding disc 4, which auxiliary disc is temporarily brought into contact with the winding disc 4 from above to assist winding, the said auxiliary disc not forming part of the support but of a mechanical winding device which does not form part of this invention. In FIG. 2a, the reel 11 of the cassette is shown between the winding disc 4 and the auxiliary disc 10. Apart from the externally driven rotatable winding disc 4, there is releaseably mounted on the support a fixed receiver 12 at the standardized distance from the winding disc 4, which receiver 12 has a centering hub 12a projecting above the winding plane and adapted to accommodate the second reel in a position corresponding to its geometrical position in the cassette, in order to tauten the loose loop of leader between the first and second reels into the position required by the cassette. The body 1 is provided with a number of bores 13a to 13f which are parallel to the shaft 6 of the rotatable winding disc, i.e. penetrate the blocks 1a and 1b of the support and have a length corresponding to the height of the narrow sides. These bores are adapted to accommodate ejector pins 14 when the positioned functional elements are transferred to one of the halves of the cassette housing, which ejector pins facilitate transfer, i.e. ensure that all of the internal functional elements of the cassette remain in the said lower half of the cassette housing when the overturned support is raised therefrom.

In the process of mechanically assembling a cassette including loading the same with magnetic tape, the support has an auxiliary function during clipping of the ends of the leader tapes to the cassette reels positioned on the centering members 4a of the rotatable winding disc 4 and the fixed receiver 12. To this end, the hubs of the reels are provided, in known manner, with a circular recess at their periphery and parallel to the axis of the reel. The shape of the recess is that required by the conventional process for clipping the tape to the reel by means of a piece of plastics wire which holds the loop of tape in said recess after the tape has been radially fed into said recess and the wire has been cut off by a cutting device.

The functional elements of the cassette are positioned on the support within tolerances which are much narrower than the permissible tolerances in the cassette itself, and this, together with the dimensions and shape of the body 1 with the screw-mounted hardened registering strips 2a and inserted hardened stops 2b, ensures that the said elements are always accurately registered with respect to the mechanical grippers of the clipping device regardless of the cycle time of 1.5 seconds, which grippers are mounted at a fixed point and operate over relatively long distances, the accuracy of said register being to approximately only one tenth of a millimeter. Futhermore, since the process of clipping the leader ends to the two reels is effected at the same time as the predetermined length of magnetic tape is wound onto the reels, it is convenient for two of the supports to effect a movement of 180° about a pivot located outside the positioned supports within a stationary unit containing the associated mechanical grippers for radially inserting the plastics wire into the recesses at the periphery of the hubs. In this way, one of the mechanical grippers at this station in the production line clips the end of the leader of a fresh length of tape to be wound, to the reel positioned on the rotatable winding disc 4 whilst at the same time, on a second support, a second mechanical gripper clips the end of the leader of a length of tape, which has already been wound onto the reel on the winding disc 4 of said support, to the reel positioned on the non-rotatable receiver 12. The use, at this station of the production line, of a special stationary unit containing two supports, which does not form part of the present invention, makes it possible to keep to the required cycle time of 1.5 seconds in a convenient manner.

On completion of winding of the magnetic tape and clipping of the ends of the leader tapes to the reels, the auxiliary disc 10 shown in FIG. 2a and connected to the stationary elements of the winding station is raised and the support is passed to the next station in the production line. Instead of a co-rotating auxiliary disc 10, an eccentrically mounted pressure plate may be used, which exerts a slight pressure on the pack of tape to effect friction sufficient to ensure that all of the tape edges form a smooth pack surface without themselves being damaged.

At the next point in the production line, the lower half of the cassette housing is placed, with the open side facing downwards, on the support now carrying all of the required functional elements. The said lower half of the cassette is provided, in a branch of the production line, with the usual screening shield and the steel pins for the guide rolls before it reaches the support. Greasing of the pins is conveniently carried out also in the same branch of the production line. The support carrying the inverted lower half of the cassette housing then moves to the next station, which contains a turnover mechanism by means of which the support is moved to a position in which the said half of the cassette housing is held in a fixed position in a holding device with all of the functional elements accurately positioned therein, the drive side of the block 1b of the support now being uppermost (see FIG. 2). This point in the production line is advantageously in the form of a circular turntable on which the final stages of manufacture and testing are carried out on the cassette passing stepwise round the station in the manner of a roundabout. However, the use of such a turntable having, for example, eight stop points, is not essential for the purposes of the present invention.

On the underside of the working surface of the next station there is mounted a driving motor which, when the outer surface of the lower half C of the cassette housing reaches said working surface under the overturned support, engages the reel by means of a spindle or expandable mandrel and effects a specific rotary motion via a clutch so as to tauten the leader of the tape wound onto the reels situated between the lower half of the cassette housing and the support.

Figure 4:
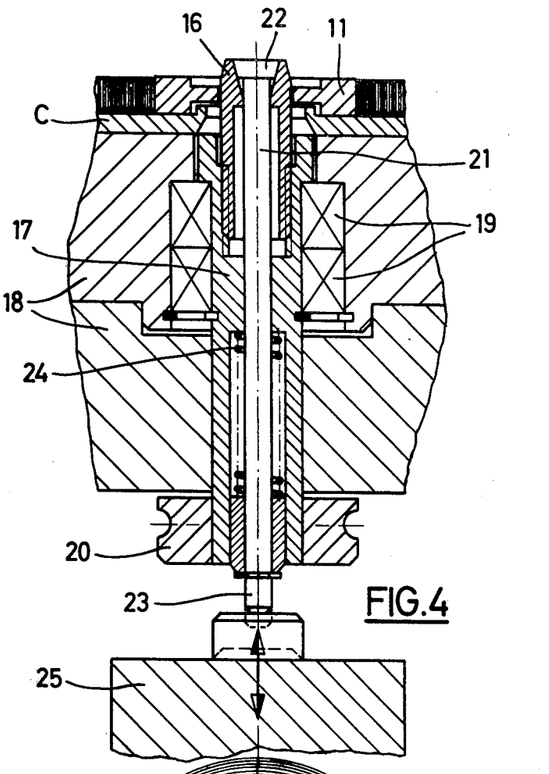
FIG. 4 is a cross section of a controllable expandable mandrel for rotating or partially rotating a reel of a cassette.
Figure 4A:
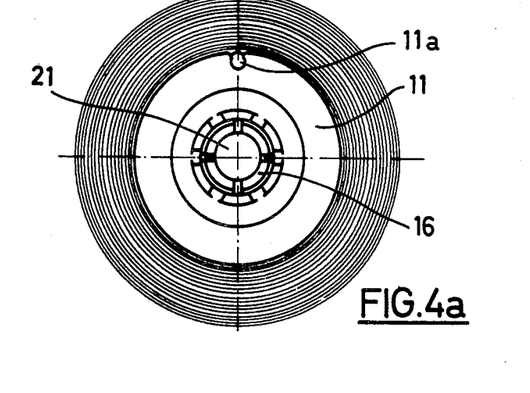
FIG. 4a is a plan view of the expandable mandrel of FIG. 4.
Figure 5A:
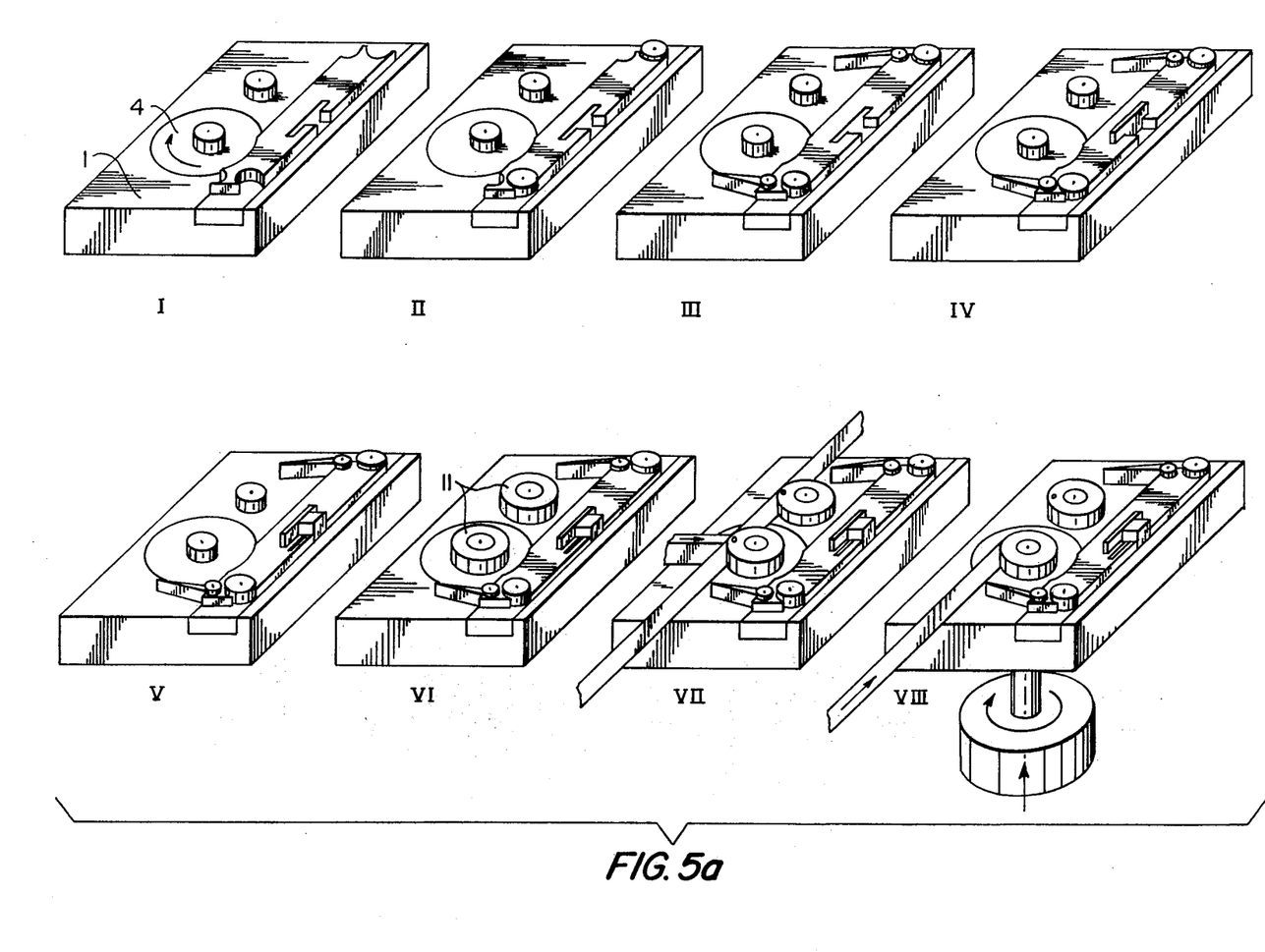
FIGS. 5a and 5b are diagrammatic illustrations of the cassette loading steps in accordance with the present invention wherein the following steps are shown.
Figure 5B:
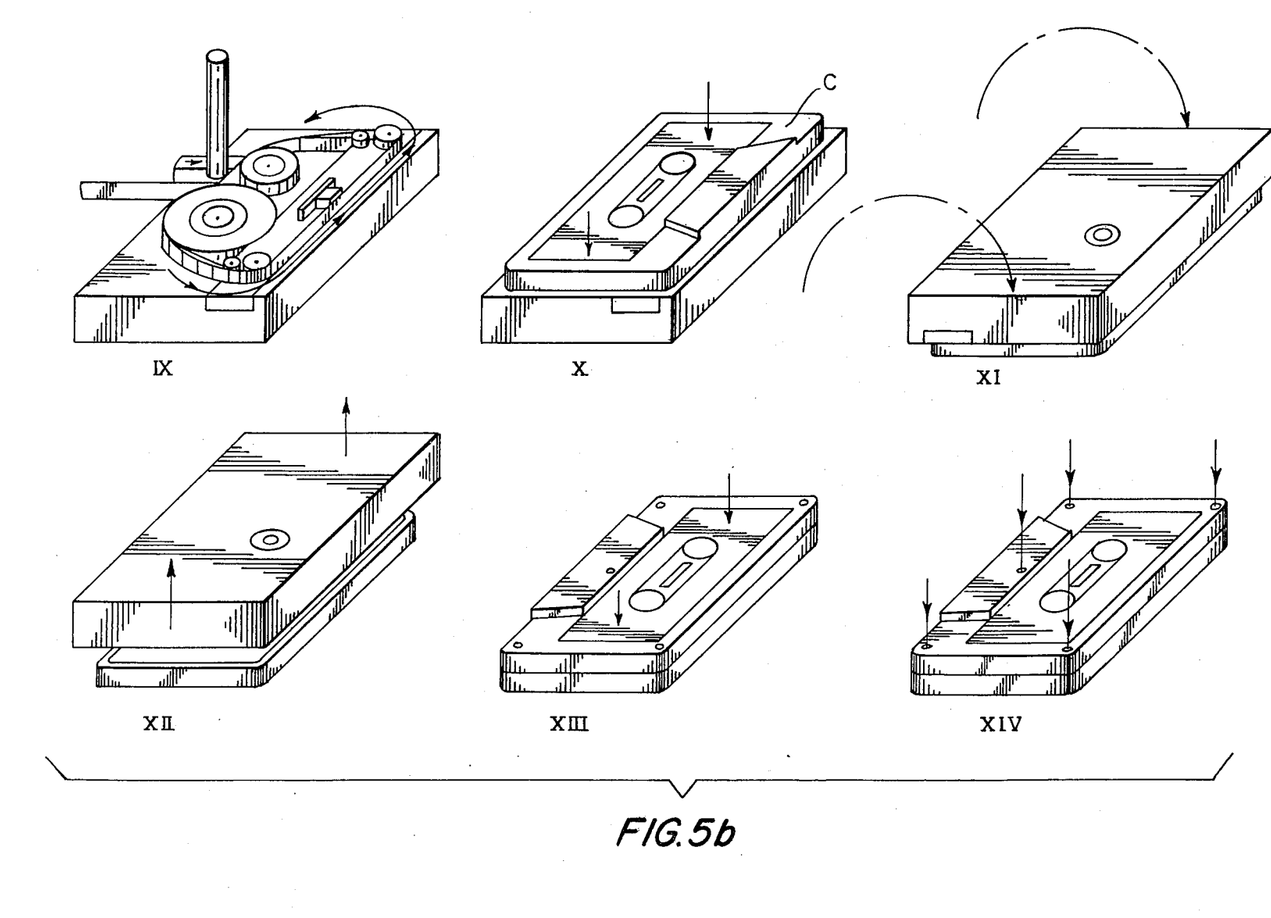
Figure 6:
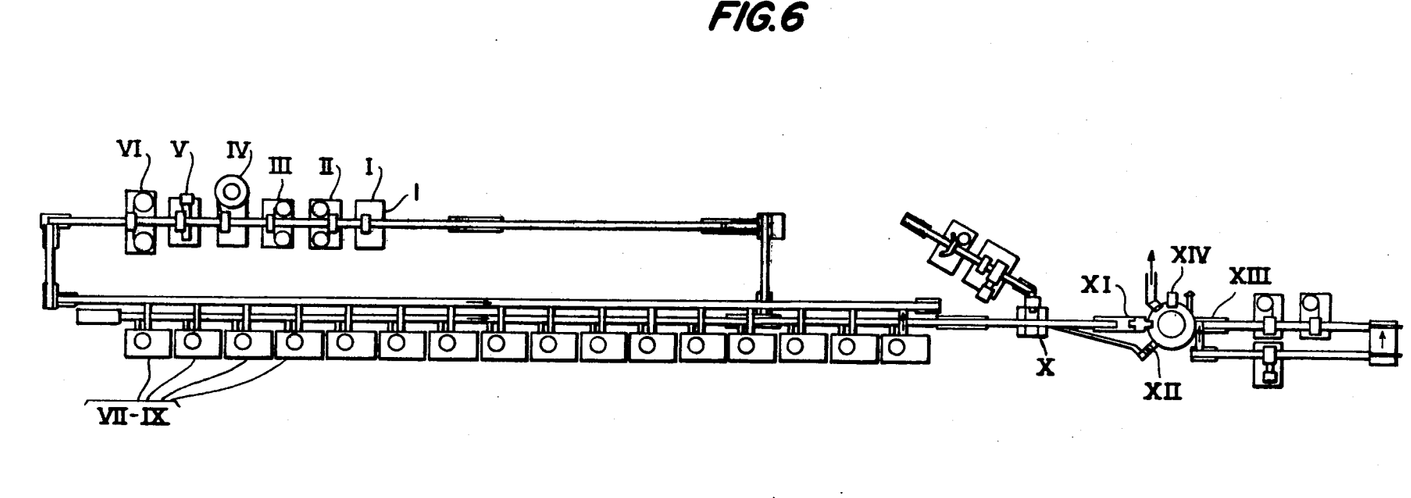
FIG. 6 is a diagrammatic plan view of a production line using the present invention which corresponds to the substeps described in FIGS. 5a and 5b.

Such an expandable mandrel which is controlled by the devices of the production line is shown in cross section in FIG. 4 and in plan view in FIG. 4a. The upper end of a cylindrical mandrel 16 engages the reel carrying a roll of magnetic tape. The cylindrical mandrel 16 is provided with a central bore which is partially conical at the top, and with a plurality of slots, so that a plurality of resilient segments are formed at the end thereof. The mandrel 16 is rotatably mounted in a hollow shaft 17 and in two block members 18 in antifriction bearings 19, rotary movement being imparted to the reel 11 by means of a pulley 20. To produce the connection between the segments at the free end of the mandrel 16 and the reel 11 in the cassette, a rod 21 with a flared head 22, which rod, via its lower end 23, can be raised and lowered in axial direction against the force of a spring 24, is arranged inside the central bore of the mandrel and the hollow shaft 17. The segments of the mandrel are forced outwardly by the flared head 22, thus producing the connection with the hole in the reel 11. The upward and downward movements of the rod 21 are controlled by an element 25 located on the production line. The reel can be partially rotated, for example to bring the recess 11a in the hub into a specific position, or rotated a number of times on the production line having mechanical means only, by means of such an expandable mandrel.

The support resting on said lower half of the cassette housing is then raised either in the same station or in the following station so as leave the lower half of the cassette housing together with the internal functional elements on said working surface. It is necessary to prevent any of the functional elements of the cassette situated within the support from being raised with the support at the high speed of raising required for the short cycle time, i.e. said elements must be prevented from sticking in the compartments of the support. This is avoided by ejector pins 14 provided on a mount of the raising device and adapted to pass through the bores 13a to 13f in the blocks 1a and 1b of the support so as to carry out a controlled movement over a predetermined vertical distance.

Figure 3:
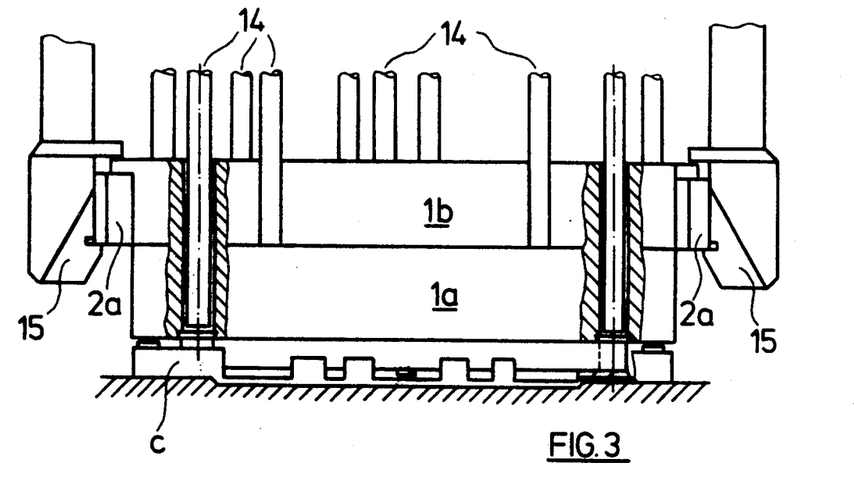
FIG. 3 is a view of the overturned support held by grippers and with retainer pins in position prior to separation from the lower half of the cassette housing.
Figure 3A:
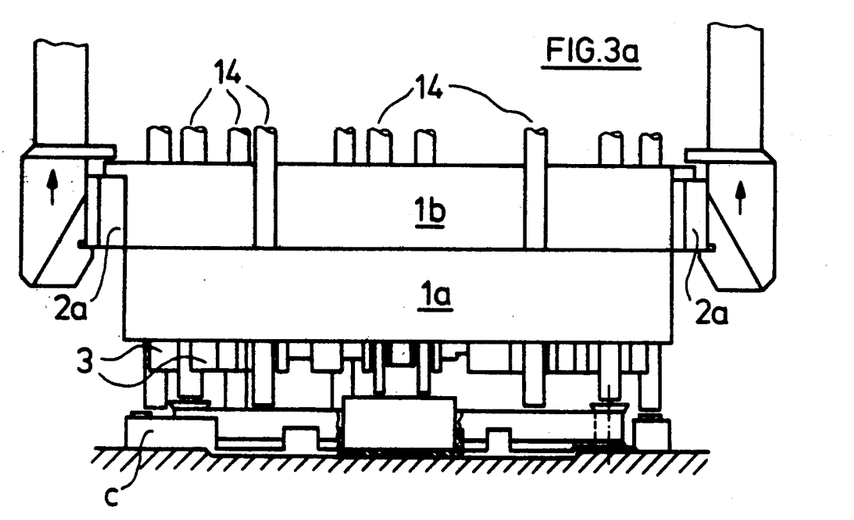
FIG. 3a is a view similar to FIG. 3 after the support has been raised.

These ejector pins move downwardly together with the grippers 15 for raising the support but stay in the lower end position for a longer period than the grippers until the support has been completely separated from the lower half of the cassette housing. The ejector pins then project beyond the support by about 6 to 7 mm (see FIGS. 3 and 3a). The ejector pins 14 can then be removed from the working surface of this station together with the grippers 15. The reel and pack of tape on the rotatable disc 4 are prevented from being axially displaced by the above-described expandable mandrel inserted therein from below. At the next station of the production line or in the next position of the aforementioned circular turntable the upper half of the cassette housing, together with a liner, is placed on the lower half. The retainer screws are then pressed or screwed into the appropriate holes by known mechanical means in order to hold the two cassette halves together in conventional manner.

Following manufacture of the cassette complete with wound-on magnetic tape of predetermined length and quality with the aid of said support, the cassette is passed to one or more testing stations in the same production line, while the supports raised in cycles from the lower halves of the cassettes are returned to the starting station of the production line, again by mechanical means.

We claim:

1. A process for the manufacture of magnetic tape cassettes in an automated production line utilizing a movable support having accurately shaped and dimensioned recesses formed therein corresponding to the structure of one of said cassette halves for the receipt of the functional elements of the cassette assembly, such as tape guide elements, pressure pads, tape reels and magnetic tape, said process comprising the steps of:

placing the functional elements of said cassette assembly in the corresponding recesses of said movable support by means of mechanical positioning devices;

clipping the magnetic tape to a first tape reel positioned for rotation on said movable support in the plane of said functional elements;

winding a predetermined length of magnetic tape on said first reel by rotating it at high speed;

wrapping said wound magnetic tape about a predetermined path about said functional elements of said cassette assembly;

clipping the free end of said wound magnetic tape to the second tape reel positioned on said movable support;

positioning the inverted lower half of said cassette housing having recesses formed therein corresponding to said functional elements of the cassette assembly over the top of said movable support;

rotating said movable support and positioned lower half of said cassette housing substantially 180° so that said movable support is located above said positioned lower half;

raising said movable support from said lower half of said cassette housing thereby transferring said functional elements, including the wound magnetic tape pack and second reel to said lower cassette half; and placing the upper half of the cassette housing having recesses formed therein corresponding to said functional elements of the cassette assembly over said lower cassette half and fastening said cassette halves together.

2. The process of claim 1 further comprising the steps of:

placing said first tape reel on a rotatable winding disc mounted on said movable support;

inserting a winding spindle into a corresponding portion of said winding disc;

releasing a brake engaging said winding disc;

rotating said spindle at high speed to wind said magnetic tape;

withdrawing said spindle from the rotatable winding disc after a predetermined length of magnetic tape has been wound on said first reel; and applying said brake to said winding disc.

3. The process of claim 1 further comprising the step of:

transferring said movable support from a conveyor to a turntable system as said support and lower half of said cassette housing are rotated 180°.

4. The process of claim 1 further comprising the step of:

fastening said cassette halves together by means of screwing in retainer screws using known mechanical elements.

5. The process of claim 1 further comprising the step of:

fastening said cassette halves together by means of pressing retainer screws in using known mechanical elements.

* * * * *